(No Model.)

W. A. GARLAND.
COFFEE POT.

No. 549,912.                    Patented Nov. 19, 1895.

Witnesses:
L. C. Hills
A. L. Hough

Inventor:
William A. Garland,
by Franklin H. Hough
Atty.

UNITED STATES PATENT OFFICE.

WILLIAM ALFRED GARLAND, OF HENDERSONVILLE, NORTH CAROLINA.

COFFEE-POT.

SPECIFICATION forming part of Letters Patent No. 549,912, dated November 19, 1895.

Application filed May 6, 1895. Serial No. 548,300. (No model.)

*To all whom it may concern:*

Be it known that I, WILLIAM ALFRED GARLAND, a citizen of the United States, residing at Hendersonville, in the county of Henderson and State of North Carolina, have invented certain new and useful Improvements in Coffee-Pots; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in coffee-pots, and especially to a construction which will prevent the direct escape of the steam from the spout, a loose false bottom being held within an outwardly-turned hollow bead located below the aperture into the spout, and the provision of an outside tube having communication with the chamber below the false bottom and leading to the upper portion of the pot. By this construction the boiling water and steam beneath the false bottom are forced up through the said outside passage-way and into the upper portion of the receptacle, where a coffee-holding strainer is held to receive the water and steam which percolate through the grounds.

A further object of the invention resides in the novel means of supporting the straining receptacle within the pot, which consists of having an inturned ring formed in the cylindrical portion of the pot at a suitable distance from its top, and against which ring the upper rim of the strainer-band is designed to rest and out of the way of the cover of the pot.

To these ends, and to such others as the invention may pertain, the same consists, further, in the novel construction, combination, and adaptation of the parts, as will be hereinafter more fully described, and then specifically defined in the appended claim.

I clearly illustrate my invention in the accompanying drawings, which, with the letters of reference marked thereon, form a part of this specification, and in which drawings—

Figure 1:
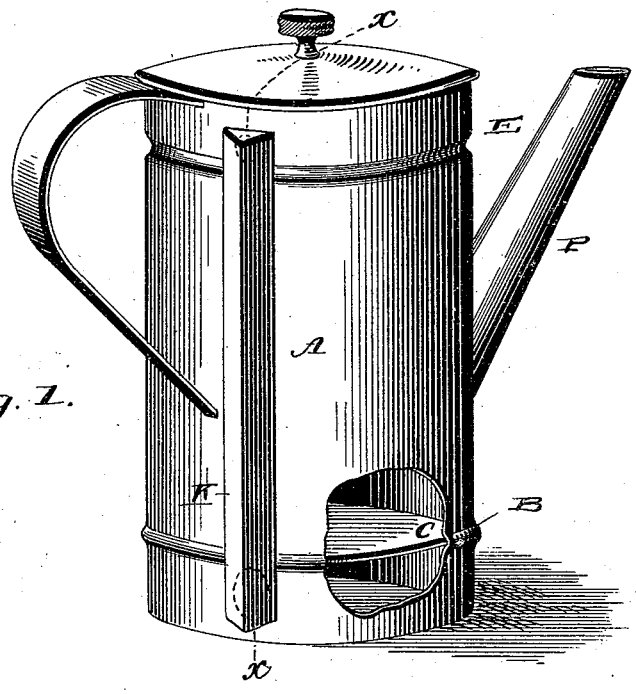
Figure 2:
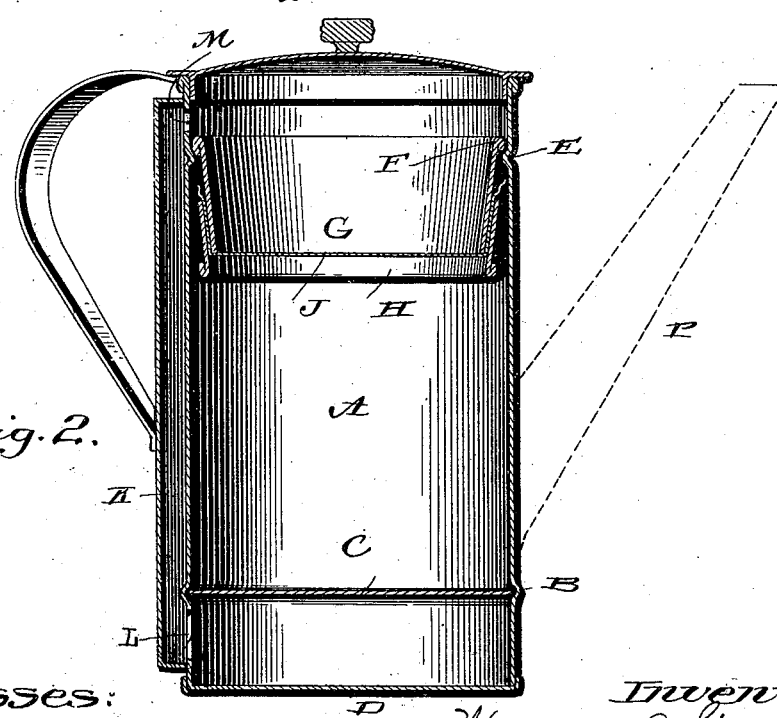

Figure 1 is a perspective view of my improved coffee-pot, a portion being broken away to show the false bottom. Fig. 2 is a vertical section on the line *x x* of Fig. 1.

Reference now being had to the details of the drawings by letter, A designates the cylinder of a coffee-pot having an outwardly-pressed bead B at a suitable distance from its bottom, and C is a false bottom which is loosely held in the annular recess of the ring, the said false bottom being inserted in place before the bottom D of the pot is soldered or otherwise secured to the bottom of the pot.

E is an inwardly-projecting bead which forms a support for the rim F of the receptacle G, and H is a band which fits over the lower portion of the receptacle G for holding the screen J in place.

K is an outside tube or passage-way, and L and M are apertures through the walls of the pot and open into the said tube K, and P is the spout, which has its inlet above the false bottom C, and it will be observed that the aperture L is located below the false bottom.

The operation of the device is as follows: Coffee-grounds are placed in the receptacle G on the strainer and water poured thereon, which, after passing through the coffee-grounds, falls on the false bottom and runs about its edge into the space below the said false bottom. The pot is then placed upon a stove and as the water begins to boil, the steam, being cut off from escape directly through the spout, is forced and carries with it part of the water through the aperture L into the outside passage-way and up and enters the receptacle through the aperture M and falls upon the grounds of coffee, through which it again percolates and falls down on the false bottom again, and any superfluous steam may then pass off through the spout, the main purpose of the invention being to retain as much of the strength and aroma of the coffee as possible before allowing it to pass off in vapor. By this method a clear liquid free from grounds may be produced.

I am aware that it has been proposed to construct a coffee-pot with a pipe extending into the pot near the bottom and also into the same near the top with portions of the pipe arranged within the coffee-pot body, and do not seek to cover such a construction, broadly. I deem it important that the tube K be a tube closed at the ends, soldered to the outside of the body of the coffee-pot, with openings in the wall of the pot affording communication between the same and the tube. This simplifies and cheapens the construction, avoids the metallic pipes located within the body of the pot, and by making the said tube triangular in cross-section I increase the metallic surface thereof and provide for the more complete condensation of the steam in its passage from the bottom to the top of the pot. It also enables me to better secure the tube to the body of the pot.

Having thus described my invention, what I claim to be new, and desire to secure by Letters Patent, is—

The herein described coffee-pot consisting of the pot proper having a false bottom loosely held in position with a passage around its periphery between the same and the wall of the pot, a strainer held in the pot near the upper end thereof, and a tube located exteriorly of and terminating entirely outside the pot and secured to the outer wall thereof with its ends closed and having communication with the interior of the pot near the top and bottom through openings in the wall of the pot above the said strainer and below the said false bottom, all substantially as shown and described.

In testimony whereof I affix my signature in presence of two witnesses.

WILLIAM ALFRED GARLAND.

Witnesses:
J. A. MADDREY,
A. B. FRIEMAN.